Jan. 12, 1932.  R. F. VESTVOLD  1,841,164
AEROPLANE
Filed April 7, 1931
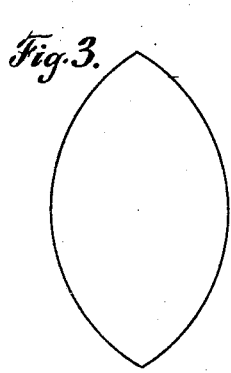
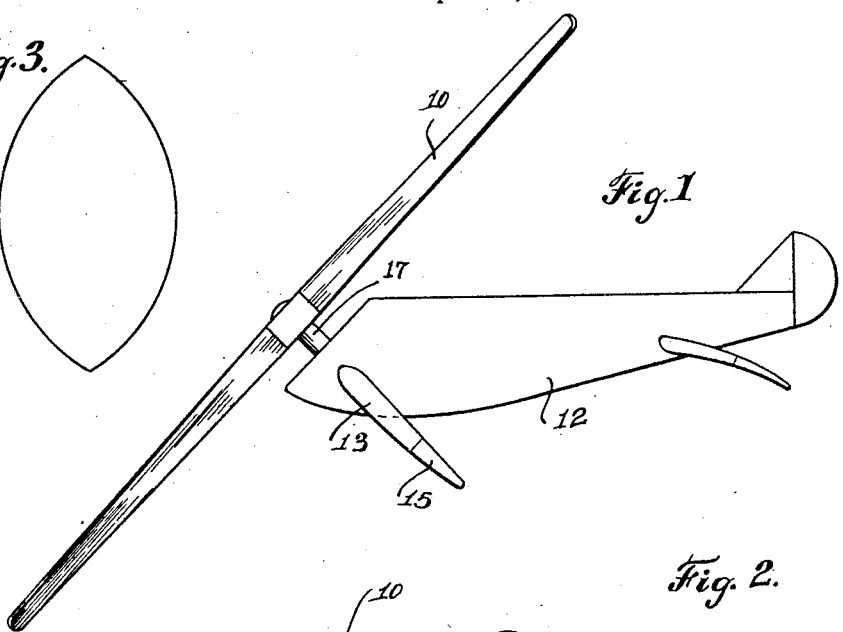
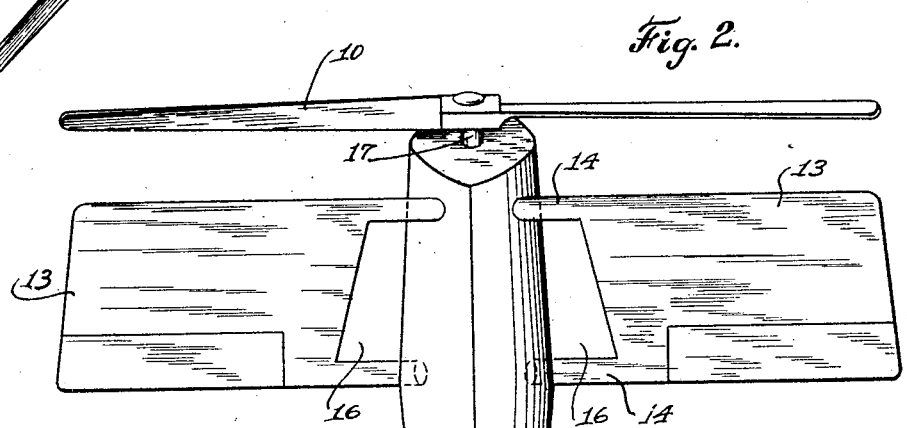
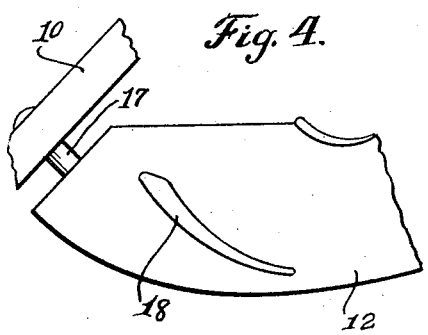
INVENTOR
Rolf F. Vestvold
BY ATTORNEY
Peter M. Boesen Patented Jan. 12, 1932

1,841,164

UNITED STATES PATENT OFFICE

ROLF F. VESTVOLD, OF HAVERFORD, PENNSYLVANIA

AEROPLANE

Application filed April 7, 1931. Serial No. 528,277.

This invention relates to new and useful improvements in aircrafts and has for its object to provide an aeroplane which, on account of its unique construction and the novel features embodied therein, will be more easy to maneuver with the resultant capability of taking off and descending within a small limited space, or designated landing place.

Another object is to provide an aeroplane that is able to rise, or ascend, more vertically, and at a greater speed than has hitherto been possible with the planes of the well known construction.

A still further object is to provide an aeroplane, that, on account of its special construction and the relatively arranged parts, constituting said plane, will be capable of supporting itself in the air without any flying speed, i. e., power applied; thus an aeroplane as herein described will be capable of standing still in the air, when tilted at the proper angle.

These objects and numerous other advantages are accomplished especially by the following construction and means;

A comparatively large propeller arranged at an angle of approximately 45 degrees to the horizontal line, although said angle may be varied, according to the purpose of the aircraft.

The said propeller arranged in the above manner provides simultaneously means of traction and lifting, as well as presenting an important carrying surface, the latter may be measured by the area of the propeller, equal to an ellipse, the length of which being always equal to the diameter of the disc-area of the rotating propeller, while the width is varying according to the inclination of the propeller and the angle of flight, or incidence.

I have shown in my construction two forms of wings, both particularly adapted for use in connection with the large and specifically arranged propeller, although serving somewhat different purposes, as will hereinafter more clearly appear.

In this connection it may be appropriate to state that the surfaces of the wings may, if desired, be cambered, this would especially be desirable in aeroplanes designed for speed and having powerful engines.

With the above and other objects in view, this invention consists of the novel features of construction, combination and arrangement of parts, hereinafter fully described, claimed and illustrated in the accompanying drawings forming part of this application and in which similar characters of reference indicate corresponding parts in all views, and in which:

Figure 1 is a side elevational view of my device;

Figure 2 is a top plane view of same; while

Figure 3 is a diagrammatic view of the fuselage; and

Figure 4 shows a fragmentary portion of an aeroplane for the purpose of illustrating a modification in the form of the wings.

Referring more particularly to the drawings, 10 indicates a propeller of the usual type but proportionately large, and with its shaft set at an angle to the fuselage 12; this angle may be of varied degrees, but an angle of 45 degrees is generally thought to be preferable.

In Figure 1 I have shown the wings 13 set at a rather steep angle to the fuselage compared with what ordinarily is the custom, and it may thus be noted that in this instance the said wings are in a plane with the propeller shaft 17. This arrangement of the wings has several important advantages; thus it offers the least possible resistance to the current of air from the propeller, it provides a safer landing in case of emergency, and it gives a greater latitude for the full use of the attached ailerons 15. As a still further advantage it deserves to be pointed out that with this arrangement of the wings a natural cooperation with the large propeller is brought about to the effect of easily bringing a plane to safely stand still in the air when the power is shut off.

For this latter purpose I provide the plane with comparatively great elevators.

The said plane has connecting struts 14, while 16 indicate open spaces.

The other parts are substantially similar to those used in the known types of planes.

While the above arrangement, as described, forms the preferred embodiment of my invention the wings may, however, be given a form, as indicated at 18 in Figure 4, where the said wings are shown cambered and in inverted position. This latter construction allows for great speed and quick climbing, and makes it possible to take off and land in a very limited space; it does, however, presuppose a rather powerful engine in order to derive the full benefit of this construction.

The fuselage has been given a somewhat elliptical form with the upper and lower terminals sharply pointed, thus offering a minimum of resistance in the air.

It is obvious that changes may be made in the form, construction and arrangement of the several parts, as shown, within the scope of the appended claims, without departing from the spirit of the invention, and I do not therefore wish to limit myself to the construction and arrangement shown and described herein.

What I claim as new, and desire to secure by Letters Patent of the United States, is:

1. In a device of the class described, a fuselage, a shaft having a propeller rotatably mounted thereon at a 90 degree angle, the said shaft forming an acute angle with the longitudinal body of the fuselage, and wings attached to the said fuselage and being arranged in an inverted position.

2. In a device of the class described, the combination with a fuselage, the latter being of a substantially elliptical form, with the upper and lower terminals sharply pointed, of a propeller arranged at an oblique position relative to the horizontal, central, longitudinal line of the body of the fuselage, a shaft connected to the said propeller at a right angle thereto, and wings attached to the said fuselage and being arranged in an inverted position.

3. In a device of the class described, the combination with a fuselage, the latter being of a substantially elliptical form, with the upper and lower terminals sharply pointed, of a propeller arranged at an oblique position relative to the horizontal, central, longitudinal line of the body of the fuselage, a shaft connected to the said propeller at a right angle thereto, and cambered wings attached to the said fuselage in an inverted position, substantially as and for the purpose set forth.

Signed at Bryn Mawr, in the County of Montgomery and State of Penna. this 24th day of March, A. D. 1931.

ROLF F. VESTVOLD.